United States Patent
Willis

(10) Patent No.: US 7,471,300 B2
(45) Date of Patent: Dec. 30, 2008

(54) PROGRESSIVE DATA DELIVERY TO SPATIAL LIGHT MODULATORS

(75) Inventor: Thomas E. Willis, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 11/037,619

(22) Filed: Jan. 18, 2005

(65) Prior Publication Data
US 2006/0158405 A1 Jul. 20, 2006

(51) Int. Cl.
*G09G 5/02* (2006.01)
*G09G 5/10* (2006.01)

(52) U.S. Cl. ............. 345/605; 345/597; 345/600; 345/692

(58) Field of Classification Search ......... 345/428, 345/55–100, 204–214, 589–605, 690–693
See application file for complete search history.

(56) References Cited

U.S. PATENT DOCUMENTS

| | | | |
|---|---|---|---|
| 5,909,204 A * | 6/1999 | Gale et al. ............... 345/85 |
| 5,969,710 A * | 10/1999 | Doherty et al. .......... 345/693 |
| 6,243,072 B1 * | 6/2001 | McKnight ................ 345/690 |
| 6,310,591 B1 * | 10/2001 | Morgan et al. ........... 345/84 |
| 6,392,656 B1 * | 5/2002 | Someya et al. .......... 345/589 |
| 6,535,187 B1 * | 3/2003 | Wood ..................... 345/84 |
| 6,756,995 B2 * | 6/2004 | Thebault et al. ......... 345/596 |
| 6,784,898 B2 * | 8/2004 | Lee et al. ................ 345/692 |
| 6,912,017 B1 * | 6/2005 | Minami et al. .......... 348/743 |
| 6,912,649 B2 * | 6/2005 | Luick ..................... 712/220 |
| 6,972,736 B1 * | 12/2005 | Wada et al. ............. 345/32 |
| 6,985,164 B2 * | 1/2006 | Rogers et al. ........... 345/692 |
| 7,007,096 B1 * | 2/2006 | Lisitsa et al. ........... 709/231 |
| 7,023,449 B2 * | 4/2006 | Childers ................. 345/597 |
| 7,154,508 B2 * | 12/2006 | Childers ................. 345/597 |
| 7,253,794 B2 * | 8/2007 | Wood ..................... 345/84 |
| 2003/0058228 A1 * | 3/2003 | Katoh et al. ............ 345/204 |
| 2005/0117805 A1 * | 6/2005 | Poutet et al. ............ 382/232 |
| 2006/0158405 A1 * | 7/2006 | Willis .................... 345/84 |

* cited by examiner

*Primary Examiner*—David L Lewis
(74) *Attorney, Agent, or Firm*—Trop, Pruner & Hu, P.C.

(57) ABSTRACT

In a spatial light modulator, a frame may be broken up into a plurality of colors. A given frame may include at least a first portion and a second portion. During the first portion of the frame, more significant bits of the data for a given pixel may be displayed and during a second portion of the frame, less significant bits may be disclosed. In some embodiments, the frame may be broken into two color subframes for each color, but in other embodiments, more than two such subframes may be utilized. In one embodiment, the frame may be broken into red, blue, and green and each color may be displayed at least twice, such that more significant bits are displayed first and less significant bits are displayed thereafter.

24 Claims, 6 Drawing Sheets

PROGRESSIVE DATA DELIVERY TO SPATIAL LIGHT MODULATORS

BACKGROUND

This invention relates generally to spatial light modulator displays.

A projection display system typically includes one or more spatial light modulators (SLMs) that modulate light for purposes of producing a projected image. The SLM may include, for example, a liquid crystal display (LCD) such as a high temperature polysilicon (HTPS) LCD panel or a liquid crystal on silicon (LCOS) microdisplay, a grating light valve or a MEMs (where "MEMs" stands for micro-electro-mechanical devices) light modulator such as a digital mirror display (DMD) to modulate light that originates from a lamp of the projection display system. In typical projection display systems, the lamp output is formatted with optics to deliver a uniform illumination level on the surface of the SLM. The SLM forms a pictorial image by modulating the illumination into spatially distinct tones ranging from dark to bright based on supplied video data. Additional optics then relay and magnify the modulated illumination pattern onto a screen for viewing.

The SLM typically includes an array of pixel cells, each of which is electrically controllable to establish the intensity of a pixel of the projected image. In some projection display systems, SLMs are transmissive and in others, they are reflective. For the purposes of simplification, the discussion will address reflective SLMs. An SLM may be operated so that each pixel has only two states: a default reflective state which causes either a bright or a dark projected pixel and a non-default reflective state which causes the opposite projected pixel intensity. In the case of an LCOS SLM, the pre-alignment orientation of the LC material and any retarders in the system determine whether the default reflective state is normally bright or normally dark. For the purposes of simplification, the discussion will denote the default reflective state as normally bright, i.e., one in which the pixel cell reflects incident light into the projection lens (the light that forms the projected image) to form a corresponding bright pixel of the projected image. Thus, in its basic operation, the pixel cell may be digitally-controlled to form either a dark pixel (in its non-default reflective state) or a bright pixel (in its default reflective state). In the case of a DLP SLM, the states may represent the pixel in a co-planar position to the underlying substrate.

Although its pixels are operated digitally, the above-described SLM may also be used in an application to produce visually perceived pixel intensities (called "gray scale intensities") between the dark and bright levels. For such an application, each pixel may be controlled by pulse width modulation (PWM), a control scheme that causes the human eye to perceive gray scale intensities in the projected image, although each pixel cell still only assumes one of two states at any one time. The human visual system perceives a temporal average of pixel intensity when the PWM control operates at sufficiently fast rates.

In the PWM control scheme, a pixel intensity (or tone) is established by controlling the time that the pixel cell stays in its reflective state and the time that the pixel cell remains in the non-reflective state during an interval time called a PWM cycle. This type of control is also referred to as duty cycle control in that the duty cycle (the ratio of the time that the pixel cell is in its reflective state to the total time the pixel cell is in its non-reflective and reflective states) of each PWM cycle is controlled to set the pixel intensity. A relatively bright pixel intensity is created by having the pixel cell spend a predominant proportion of time in its reflective state during the PWM cycle, while a relatively dark pixel intensity is created by having the pixel cell spend a predominant amount of time in its non-reflective state during the PWM cycle.

The quality of the projected image typically is a function of the number of possible gray scale intensities, also called the "bit depth." For the above-described PWM control scheme, a bit depth of "N" means that the PWM cycle is divided into $2^N$ time consecutive and non-overlapping time segments. For a particular PWM cycle, each of the time segments in which the pixel cell is in its reflective state contributes to the overall luminance of the corresponding pixel. Each time segment of the PWM cycle typically corresponds in duration to the cycle of a clock signal. Thus, the larger the number of time segments (i.e., the greater the number of gray scale intensities), the higher the frequency of this clock signal, thereby requiring a high speed clock to form the pixel gray scale or tonal range. Power consumption is also a function of this clock frequency and also increases with bit depth.

Other factors may increase the clock rate needed for a particular bit depth. For example, for a three SLM LCD panel projection system (one SLM for each primary color), the PWM cycle may have a period that is equal to one half of the video data's field time (typically 1/60 second). Opposite drive voltage polarities are needed in LCD systems to prevent voltage bias accumulation. This is well known for liquid crystal display systems. Thus, LCD SLM devices require two PWM cycles in each video data field. This doubles the clock rate requirement.

For a two SLM panel projection system where one of the SLM panels is temporally shared by two primary colors, the video frame time must be split to allocate PWM cycles to each primary color, thereby increasing the needed PWM clock rate if the same bit depth is maintained in all colors.

For a one SLM panel projection system with an SLM panel temporally shared by all three primary colors, the video frame time must be further subdivided. For an LCOS SLM the video frame time would be divided into six PWM cycles, a pair for each primary color. The PWM clock period may have an even shorter duration when the unequal length PWM cycles are needed to adjust the display white point. Since common projection lamps are rich in blue and weak in red output, it is generally necessary to devote longer portions of the video frame time to red to achieve white balance. This necessitates the PWM clock period to be increasingly small and the clock frequently and power consumption to be increasingly high.

DETAILED DESCRIPTION

Figure 1:
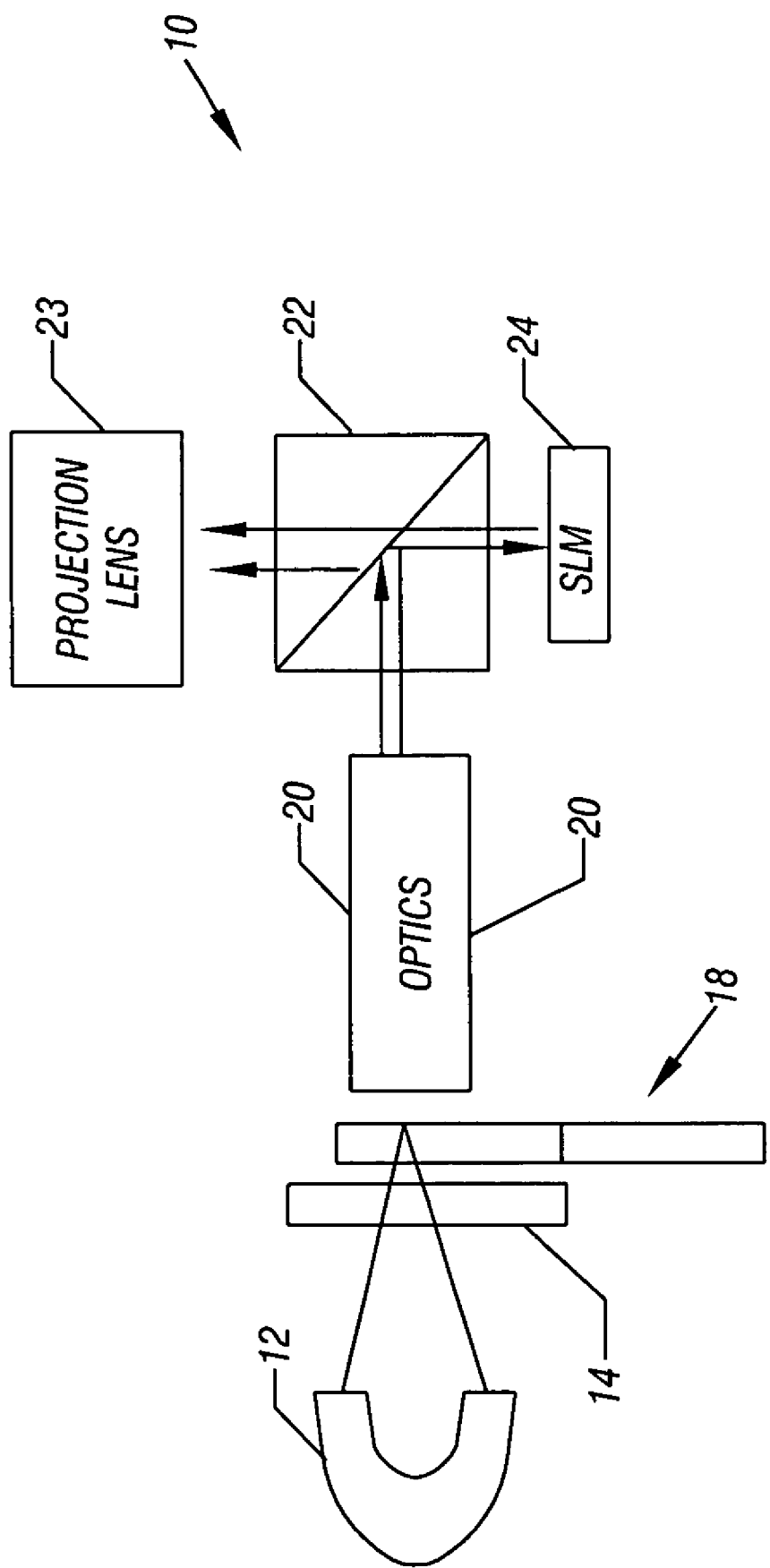
FIG. 1 is a schematic diagram of a projection display system according to an embodiment of the invention.

Referring to FIG. 1, a projection display system 10 in accordance with an embodiment of the invention includes one or more spatial light modulators (SLMs) 24 (one shown in FIG. 1) that modulate impinging light to produce a projected composite, color optical image (herein called "the projected image"). The SLM 24 may be either a liquid crystal (LC) SLMs, a tilt-mirror SLM, or a MEMs type SLM, depending on the particular embodiment of the invention. Unless otherwise stated, embodiments described herein use LC SLMs for purposes of simplifying the description. However, it is understood that other SLMs, such as grating light valve, HTPS, or other technology SLMs, may be used, in other embodiments of the invention. Furthermore, unless otherwise noted below, the projection display system 10 includes a single SLM 24, for purposes of simplifying the following description, although other projection systems that have multiple SLMs may be alternatively used and are within the scope of the appended claims.

In accordance with some embodiments of the invention, the projection display system 10 includes a lamp 12 (a mercury lamp, for example) that produces a broad visible spectrum illumination beam that passes through an ultraviolet/infrared (UV/IR) filter 14 of the system 10. The light passing from the filter 14, in turn, passes through a rotating color wheel.

A function of the color wheel 18 is to serve as a time-varying wavelength filter to allow certain wavelengths of light to pass therethrough at the appropriate times so that the filtered light may be modulated by the SLM 24 to produce the projected image. More specifically, in some embodiments of the invention, the projection display system 10 may be a shared color system, a system in which, for example, the SLM 24 modulates red, followed by green, followed by blue light. Thus, the SLM 24 is temporally shared to modulate different primary color beams.

As previously stated, the single-SLM configuration that is depicted in FIG. 1 is for purposes of example only. Thus, the projection display system 10 may be replaced by another projection display system, in other embodiments of the invention, such as a projection display system that includes three SLMs, one for each primary color (red, green and blue, for example) of the projected image. As another example, in some embodiments of the invention, red, green and blue light may be temporally shared on an SLM in a two SLM display projection system. Therefore, many variations are possible and are within the scope of the appended claims.

Referring to FIG. 1, among its other components, the projection display system 10 includes homogenizing and beam shaping optics 20 that further shape and collimate the light that exits the color wheel 18, prepolarizes and directs the resultant beam to the polarizing beam splitter 22. The polarizing beam splitter (PBS) 22 separates the light from the color wheel 18 based on polarization. More specifically, assuming the single-SLM configuration described above, the polarizing beam splitter 22 directs the different color sub-bands of light (at different times) to the SLM 24. Once modulated by the SLMs 24, the polarizing beam splitter 22 directs the modulated beam through projection lenses 23 for purposes of forming the projected image.

Depending on the particular embodiment of the invention, the SLM 24 may be a digital mirror device (DMD), liquid crystal display (LCD) device, or other pixelated SLM. In some embodiments of the invention, the SLM 24 is a liquid crystal on silicon (LCOS) device that includes a liquid crystal layer that is formed on a silicon substrate in which circuitry (decoders, control circuits and registers, for example) to control and operate the device is fabricated.

Figure 2:
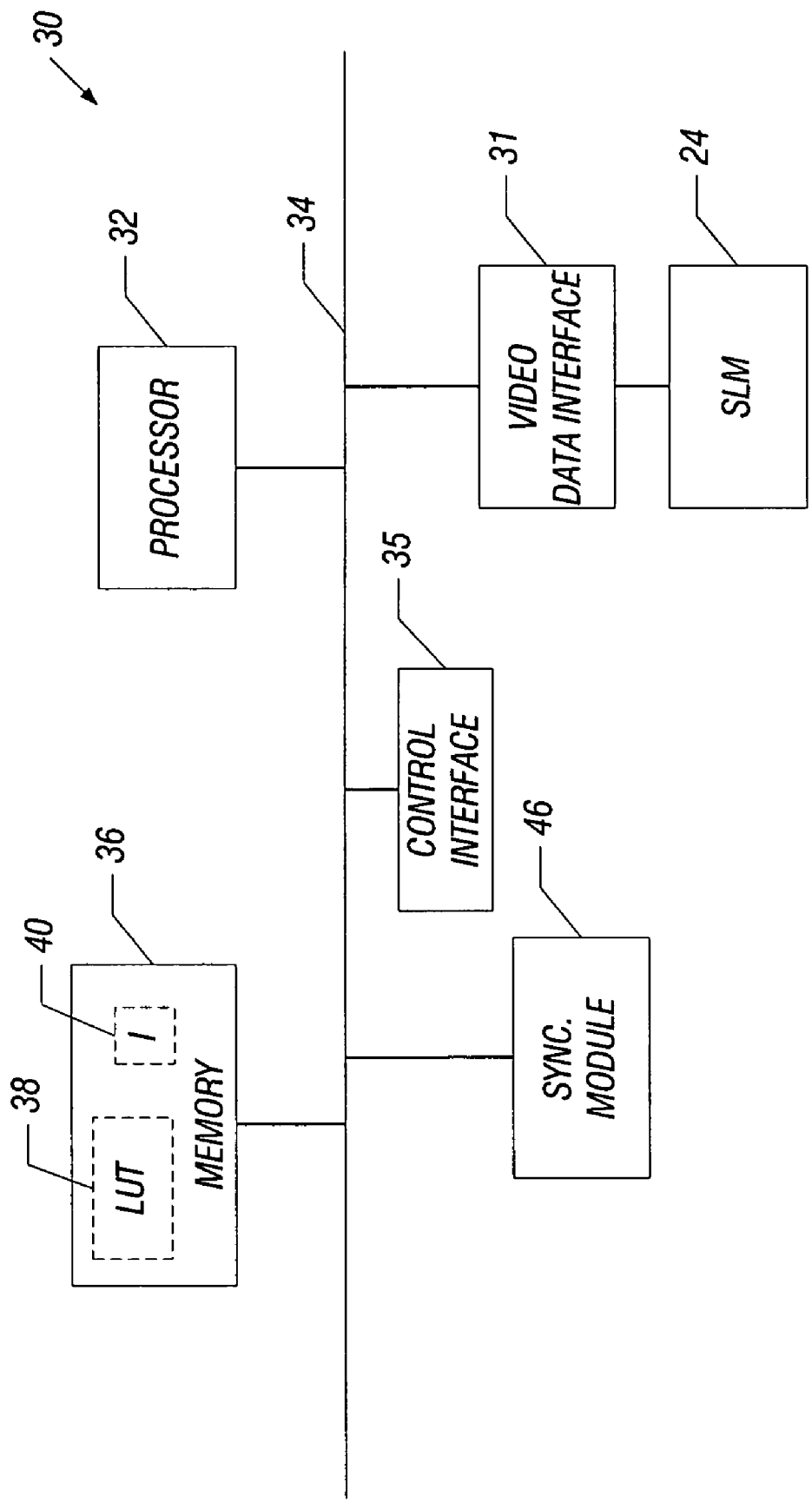
FIG. 2 is a block diagram of an electrical system of the projection display system according to an embodiment of the invention.

In some embodiments of the invention, an electrical system 30 for the projection display system 10 (FIG. 1) may have a general structure that is depicted in FIG. 2. Referring to FIG. 2, the electrical system 30 may include a processor 32 (one or more microcontrollers or microprocessors, as examples) that is coupled to a system bus 34. The processor 32 communicates over the system bus 34 with a memory 36 (a flash memory, for example) of the electrical system 30. The memory 36 stores instructions 40 to cause the processor 32 to perform one or more of the techniques that are described herein, as well as a look-up table (LUT) 38.

In some embodiments of the invention, the projection display system 10 (FIG. 1) operates the pixel cells of the SLM 24 in a digital fashion, in that each pixel cell at any one time is either in a reflective state or a non-reflective state. Gray scale intensities are achieved by pulse width modulation (PWM), a modulation technique that controls the optical behavior of the pixel cell during an interval of time called a PWM cycle to control the intensity of the corresponding pixel of the projected image. The PWM control regulates the amount of time that a particular pixel cell is in its reflective and non-reflective states during a PWM cycle for purposes of establishing a certain pixel intensity. The amount of time that the pixel cell is in each reflectivity state for a given pixel intensity value is established by the LUT 38, in some embodiments of the invention. It is noted that in some embodiments of the invention, the LUT 38 may represent a collection of LUTs, one for each primary color. For purposes of simplifying the discussion herein, only one LUT is assumed, unless otherwise stated. The LUT 38 indicates a PWM duty cycle for each potential pixel intensity value.

Among its other features, the electrical system 30 may include a color wheel synchronization module 46 and a video data interface 31 that are coupled to the system bus 34. The color wheel synchronization module 46 can serves to assist in ensuring that the physical position of the color wheel 18 is aligned with the start of a PWM timing cycle. The video data interface 31 receives pixel intensity data that is mapped through LUT 38 to specify per pixel PWM data (to drive the SLM 24).

In some embodiments of the invention, the LUT 38 includes a corresponding duty cycle entry for each unique pixel intensity value. The duty cycle entry indicates a duration that the pixel cell remains in its default reflective state during the PWM cycle to produce the desired pixel intensity. The pixel cell remains in the non-default reflective state during the remainder of the PWM cycle. In some embodiments of the invention, each table entry indicates a number of pulse width modulation (PWM) counts, or clock cycles, for each intensity value. These are the number of clock cycles that the pixel cell needs to remain in its default reflective state. For the remaining clock cycles of the PWM cycle (having a fixed duration, for example), the pixel cell is in its non-default reflective state. The PWM clock counts may be executed with the non-reflective portion first and the reflective portion second or with the reflective portion first and the non-reflective portion second. In other embodiments, fractions of the total reflective and non-reflective clock counts may be alternated during a PWM cycle. In any execution strategy, the LUT-prescribed time proportion remains consistent relative to the whole PWM cycle time.

Figure 3:
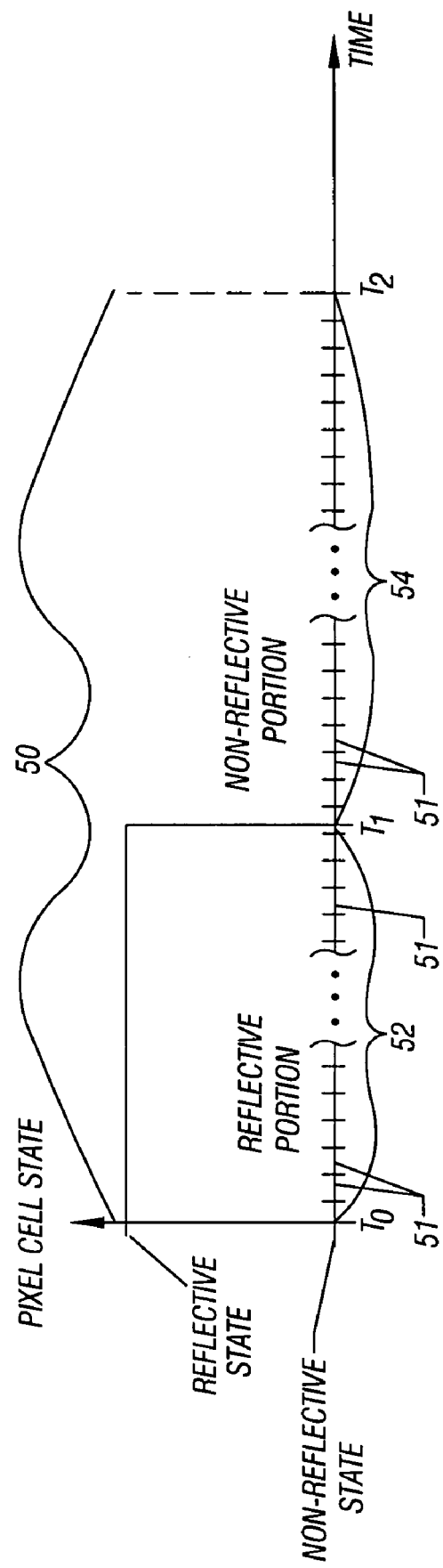
FIG. 3 is an illustration of a pulse width modulation control technique for a pixel cell according to an embodiment of the invention.

Referring to FIG. 2 in conjunction with FIG. 3, the processor 32, for a given video data value, retrieves the corresponding PWM count from the LUT 38. The retrieved value, in turn, determines the number of PWM clock counts that, in turn, govern the duration of a reflective portion 52 of a PWM cycle 50. The remaining counts form a non-reflective portion 54 (i.e., the remaining portion) of the PWM cycle 50. Stated differently, the PWM cycle 50 may be viewed as being formed from consecutive and non-overlapping time segments 51, each of which has the duration of a specified number of clock cycles. In some embodiments of the invention, the pixel cell, at the beginning of the PWM cycle 50, is in the non-reflective state. The number of PWM counts determine the number (if any) of time segments 51 from time $T_0$ until time $T_1$ (at the end of the reflective portion 52 of the PWM cycle 50) in which the pixel cell remains in the reflective state. At the conclusion (time $T_1$) of the reflective portion 52, the pixel cell transitions to its non-reflective state (to begin the non-reflective portion 54) until the end of the PWM cycle 50 at time $T_2$.

The duration of the PWM cycle 50 depends on the configuration of the projection display system. For the single liquid crystal SLM panel-configuration of the projection display system 10 (FIG. 1), the PWM cycle time is equal to a multiple of one sixth of the field time interval (1/60 seconds). The multiple may be set as desired to mitigate color breakup, a visual artifact associated with temporal color sequential displays. PWM cycle times may be at 1/240 Hz, 1/360 Hz, and so on. Each pair of PWM cycles is dedicated to an illumination color primary (red or green or blue). One PWM cycle asserts a first voltage polarity and the second PWM cycle asserts the opposite voltage polarity while driving the pixel cell to establish the pixel intensity (such as the PWM cycle 50). More specifically, the second PWM cycle should assert the bright state for the same duty cycle duration as the first PWM cycle, except that the voltage field across the liquid crystal material is reversed in polarity. Additionally, the reflectivity state sequence in the second PWM cycle may proceed in the reverse time order of the driving PWM cycle.

Using the retrieved value from the LUT 38, the processor 32, in accordance with some embodiments of the invention, utilizes the corresponding PWM count to time the duration of the PWM cycle for the respective pixel by means of the video data interface 31 (FIG. 2).

Figure 4:
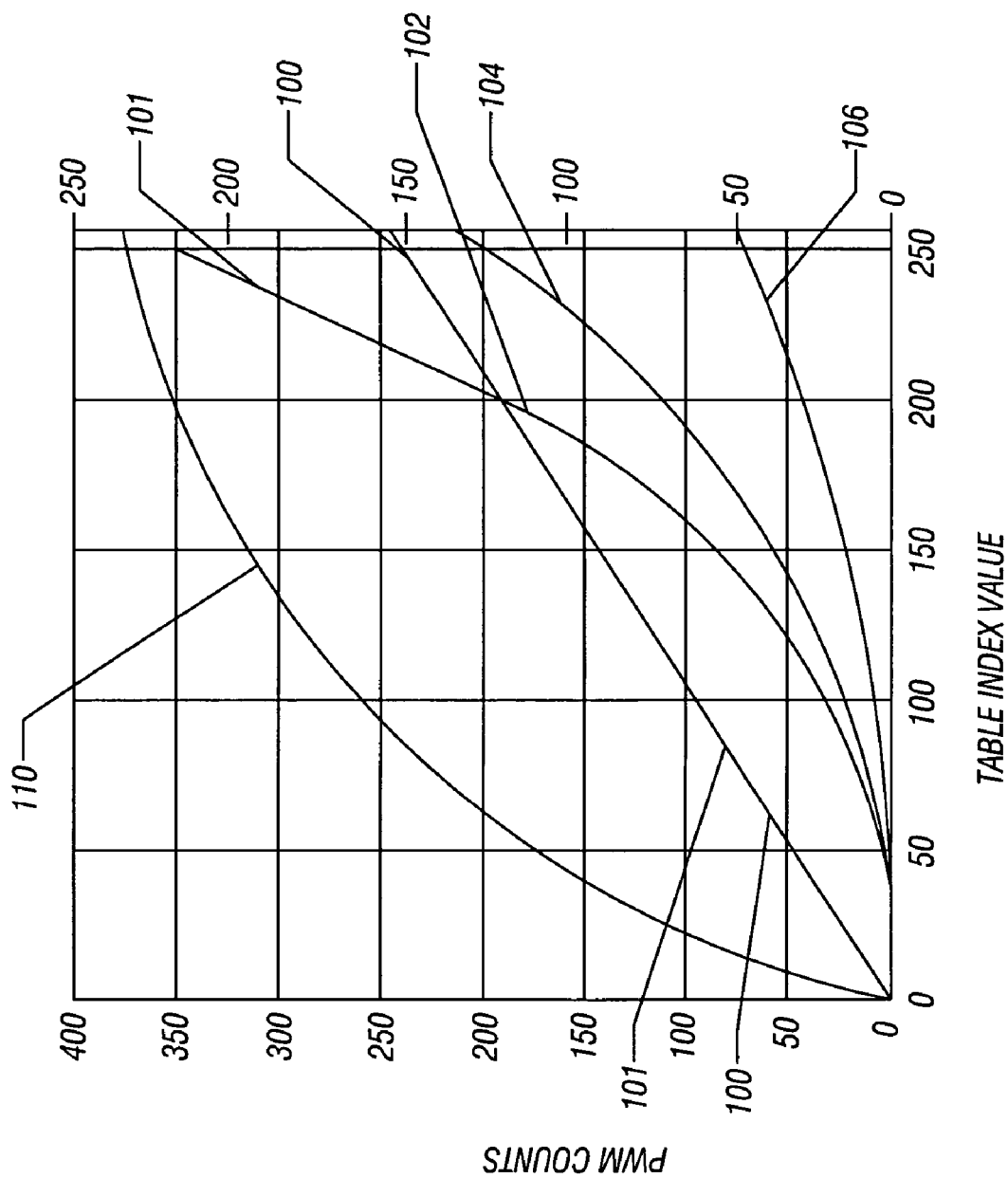
FIG. 4 depicts relationships between pixel intensities and a table index value.

Referring to FIG. 3, in some embodiments of the invention, the entries of the LUT 38 (FIG. 2) establish a relationship between the PWM counts and the received video data values (represented by "table index values" in FIG. 4). For example, the LUT 38 establishes, in conjunction with other features of the display projection system 10 described below, relationships between the video data values and the pixel intensities that appear in the projected image. However, the video data that is furnished to the projection display system 10 may not have a linear relationship to the pixel intensities that are required for the projected image because the video data may be pre-compensated to drive a non-linear cathode ray tube (CRT) display, for example.

More specifically, the video data that is furnished to the projection display system 10 (FIG. 1) may be pre-compensated to accommodate the non-linear responses of phosphors of a CRT display. Thus, a conventional CRT display receives the pre-compensated video data and directly drives the CRT tube with this data. However, for a SLM display system, such as the projection display system 10, the pre-compensation must be removed from the video data. Therefore, the relationship between the video data and the PWM counts should not be linear, but rather, should be non-linear in a manner that removes the CRT pre-compensation and applies gamma compensation appropriate for the SLM in the projection system. The correct gamma compensation required will depend on the voltage to reflectance transfer characteristics of the SLM as well as the application. For office displays, it is common to drive to a final optical gamma of 2.2, while for home theater, it is more common to drive to a final optical gamma of 2.5.

More specifically, still referring to FIG. 4, system 10 should establish a non-linear relationship between the video data that is furnished to the system 10 and the PWM clock counts. A curve 106, for example, represents the needed relationship imposed by the LUT 38 between the blue component video data and the blue SLM PWM count; a curve 104 represents the needed relationship between the green component video data and the green SLM PWM count; and a curve 102 represents the needed relationship between the red component video data and the red SLM PWM count.

Figure 5:
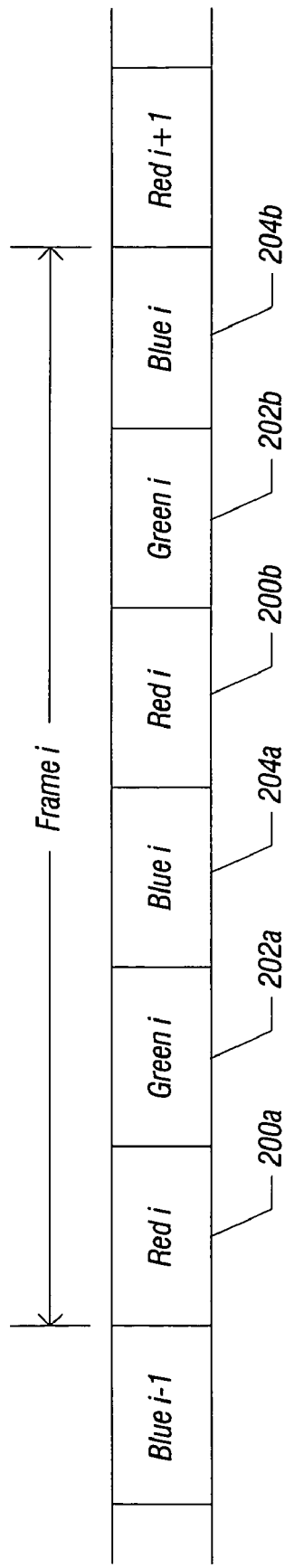
FIG. 5 is a color sequence for one embodiment of the present invention.

Referring to FIG. 5, a frame I may be made up of two subframes of each of three primary colors. Thus, two red subframes 200a and 200b may be used together with two green subframes 202a and 202b and two blue subframes 204a and 204b. The first three subframes 200a, 202a, and 204a may contain the more significant bit information. Prior to the receipt of the second set of subframes 200b, 202b, and 204b, it may be assumed that their values are zero.

Thus, in the subframe 200a, the more significant bits of pixel data in the timeframe for the first red subframe 200a are loaded and then the less significant bits in time for the second red subframe 202b are loaded thereafter. In an embodiment using eight bits to represent each primary color information, each subframe may be four bits.

In this case, the modulation in the first color subframe assumes that the yet to be delivered subframe data is zero. By allowing different color fields to modulate the material differently, the system 10 can account for the lack of data in the second or later color subframe. Essentially, as the system 10 proceeds into the frame, the modulation becomes progressively more refined as the amount of data available to the modulation algorithm increases, until all the pixel intensity value bits are available. Thus, in some embodiments, the system 10 reduces its input bandwidth requirements without resorting to additional buffering or performance degradation.

Figure 6:
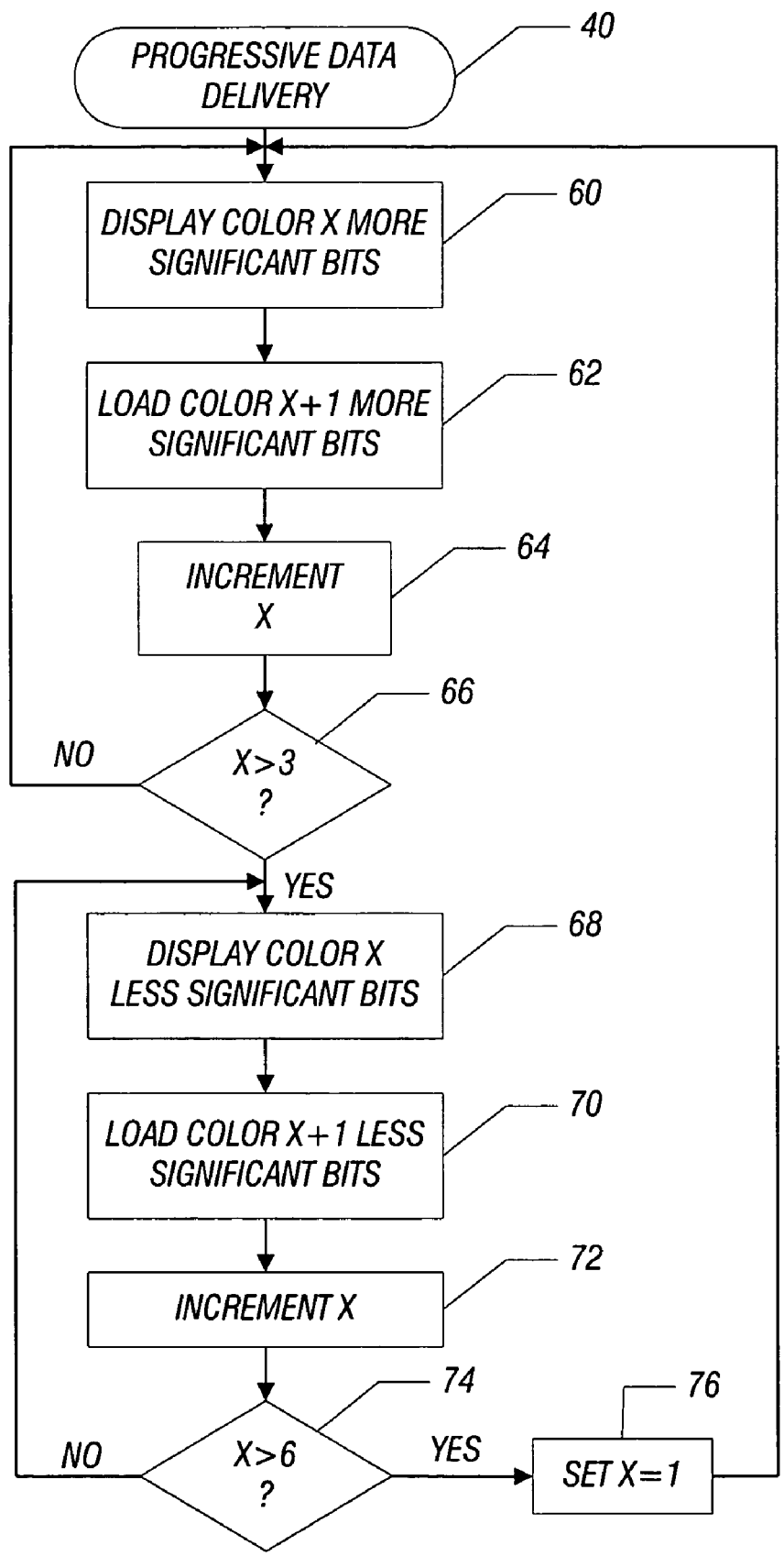
FIG. 6 is a flow chart of one embodiment of the present invention.

Thus, referring to FIG. 6, the progressive data delivery software 40 begins by displaying the color X more significant bits as indicated in block 60. Each of the primary colors may be assigned a variable X value of from one to three. In the illustrated embodiment, each frame is made up of two subframes composed of the same color data. However, any number of subframes may be used.

Moreover, while the sequence is indicated to be red, then green, then blue, other sequences may be used as well.

After the first color (e.g., X=1 where one is red) is displayed, the next color may be loaded as indicated in block 62. More particularly, the second color, in this instance X=2 where two is green, may be loaded while displaying the first color, in this example, red. Then, the variable X is incremented as indicated in block 64. If the variable X is greater than 3, indicating that the first set of subframes 200a-204a have been already displayed, the flow increments to the second half of the program. Otherwise, it turns to the top of the flow and increments until all three colors of the first subframe are completed, assuming an embodiment with three primary colors.

If at diamond 66, the variable X has been incremented over three, the less significant bits of color X, where X=1, are displayed as indicated in block 68. This would correspond in the example shown in FIG. 5 to displaying the less significant bits of the red subframe 200b. While an embodiment with only two subframes and three primary colors is disclosed, a system with multiple subframes, including three or more sets of more and less significant bits may be progressively displayed.

Then, as indicated in block 70, the less significant bits of the next color subframe are loaded while the previous color subframe is displayed in accordance with one embodiment of the present invention. Thereafter, as indicated in block 72, the variable X is incremented. If X is now greater than six, as determined in diamond 74, the flow goes to set X=1 and proceeds back to the top of the flow. Otherwise, the flow increments through the second set of less significant bit subframes 200b-204b in this example.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    successively displaying more significant bits of each of three primary colors during a first portion of a frame assuming, while displaying said more significant bits, that said less significant bits will be zero; and
    displaying less significant bits of each of the three primary colors during a second part of the frame.

2. The method of claim 1 including loading the next color while displaying a previous color.

3. The method of claim 1 including displaying said more significant bits before displaying said less significant bits.

4. The method of claim 1 including displaying the most significant bits of at least two colors and then displaying the least significant bits of at least two colors thereafter.

5. The method of claim 4 including displaying the most significant bits of at least three primary colors and then displaying the least significant bits of at least three primary colors.

6. The method of claim 1 including displaying said bits in a rear projection display.

7. An article comprising a medium storing instructions that, if executed, enable a processor-based system to:
    successively display more significant bits of each of three primary colors during a first portion of a frame and assume, while displaying said more significant bits, that the less significant bits will be zero; and
    display less significant bits of each of three primary colors during a second part of the frame.

8. The article of claim 7 further storing instructions that, if executed, enable the processor-based system to display three primary colors, each color including a first and second portion, said first portion including more significant bits and said second portion including less significant bits.

9. The article of claim 8 further storing instructions that, if executed, enable the processor-based system to display a first portion of a first color, a first portion of a second color, and a first portion of a third color and then display said second portions of said first, second, and third colors.

10. The article of claim 7 further storing instructions that, if executed, enable the processor-based system to break three primary colors into only a first and only a second portion for each color.

11. The article of claim 7 further storing instructions that, if executed, enable the processor-based system to load the next color while displaying a previous color.

12. The article of claim 7 further storing instructions that, if executed, enable the processor-based system to display said more significant bits before displaying said less significant bits.

13. The article of claim 7 further storing instructions that, if executed, enable the processor-based system to display the most significant bits of at least two colors and then display the least significant bits of at least two colors thereafter.

14. The article of claim 13 further storing instructions that, if executed, enable the processor-based system to display the most significant bits of at least three primary colors and then display the least significant bits of at least three primary colors.

15. The article of claim 7 further storing instructions that, if executed, enable the processor-based system to display said bits in a rear projection display.

16. A projection display comprising:
    a spatial light modulator; and
    a device to cause the spatial light modulator to successively display more significant bits of each of three primary colors during a first portion of a frame and less significant bits of the three primary colors during a second part of the frame, said device to assume, while displaying more significant bits, that said less significant bits will be zero.

17. The display of claim 16 wherein said device to cause said spatial light modulator to display three primary colors, each color including a first and second portion, said first portion including more significant bits and said second portion including less significant bits.

18. The display of claim 17 wherein said device to display a first portion of a first color, a first portion of a second color, and a first portion of a third color and then display said second portions of said first, second, and third colors.

19. The display of claim 16, said device to break said three primary colors into only a first and only a second portion for each color.

20. The display of claim 16, said device to load the next color while displaying a previous color.

21. The display of claim 16, said device to display the more significant bits before displaying said less significant bits.

22. The display of claim 16, said device to display the most significant bits of at least two colors and then display the least significant bits of at least two colors thereafter.

23. The display of claim 22, said device to display the most significant bits of at least three primary colors and then display the least significant bits of at least three primary colors.

24. The display of claim 16 wherein said device includes a processor and a memory storing instructions for said processor.

* * * * *